May 26, 1953 W. R. BENNETT 2,640,105

WAVE TRANSMISSION SYSTEM AND METHOD FOR SYNTHESIZING A GIVEN ELECTRICAL CHARACTERISTIC

Filed Oct. 10, 1947 4 Sheets-Sheet 1

INVENTOR
W. R. BENNETT
BY N. S. Ewing
ATTORNEY

INVENTOR
W. R. BENNETT
BY
N. S. Ewing
ATTORNEY

May 26, 1953 W. R. BENNETT 2,640,105

WAVE TRANSMISSION SYSTEM AND METHOD FOR SYNTHESIZING
A GIVEN ELECTRICAL CHARACTERISTIC

Filed Oct. 10, 1947 4 Sheets-Sheet 3

INVENTOR
W. R. BENNETT
BY
N. S. Ewing
ATTORNEY

May 26, 1953 W. R. BENNETT 2,640,105

WAVE TRANSMISSION SYSTEM AND METHOD FOR SYNTHESIZING A GIVEN ELECTRICAL CHARACTERISTIC

Filed Oct. 10, 1947 4 Sheets-Sheet 4

INVENTOR
W. R. BENNETT
BY
N. D. Ewing
ATTORNEY

Patented May 26, 1953

2,640,105

UNITED STATES PATENT OFFICE 2,640,105

WAVE TRANSMISSION SYSTEM AND METHOD FOR SYNTHESIZING A GIVEN ELECTRICAL CHARACTERISTIC

William R. Bennett, Summit, N. J., assignor to Bell Telephone Laboratories, Incorporated, New York, N. Y., a corporation of New York Application October 10, 1947, Serial No. 779,113

8 Claims. (Cl. 178—44)

This invention relates in general to electrical wave transmission, and more particularly to the modification of electrical signals in accordance with preselected patterns of amplitude, frequency and phase.

In accordance with usual prior art practice, desired modifications in the amplitude versus frequency and/or phase characteristics of electrical signals have been obtained by the use of networks containing as elements resistances, inductances, and capacitances combined in conformance with well-known principles of steady-state theory to produce desired effects. Circuits of the foregoing type become complicated and cumbersome when it is necessary to produce certain odd and unusual response characteristics.

More recently, systems for producing similar modifications in electrical signals have been devised in accordance with time-function theory, by taking into account the transient responses of a system to an impressed input signal which add up at successive instants to produce a desired signal in the output. Systems of the foregoing type are disclosed in Patents 2,024,900, December 17, 1935, 2,124,599, July 26, 1938, and 2,128,257, August 30, 1938, to N. Wiener and Y. Lee, and in application Serial No. 731,232, filed February 27, 1947 by L. C. Peterson and R. K. Potter, now Patent 2,575,393.

It is the principal object of the invention herein set forth to improve the time-function technique of modifying electrical signals.

In accordance with the present invention, the aforesaid object is realized in a system which performs a series of functional steps including the following:

(1) Sampling an impressed electrical signal at discrete intervals, and holding each sample for a predetermined interval;

(2) Multiplying each held sample by a predetermined weighting function; and (3) Continuously collecting the successive weighted samples to produce a desired output function.

In one embodiment, the system of the present invention comprises a cathode-ray tube and associated sampling and holding circuits. The held samples of the impressed signal are utilized to intensity-modulate a cathode-ray beam which is periodically swept over a shaped target. Output current proportional to the samples thus weighted is continuously collected in the form of secondary radiation from the target.

In another embodiment several modifications of which are described herein, a plurality of such cathode-ray tubes are operated in tandem, and their outputs continuously superposed.

The invention will be better understood from a study of the illustrative embodiments which are shown in the attached drawings and described in detail with reference thereto.

Figures 2A, 2B, 2C:
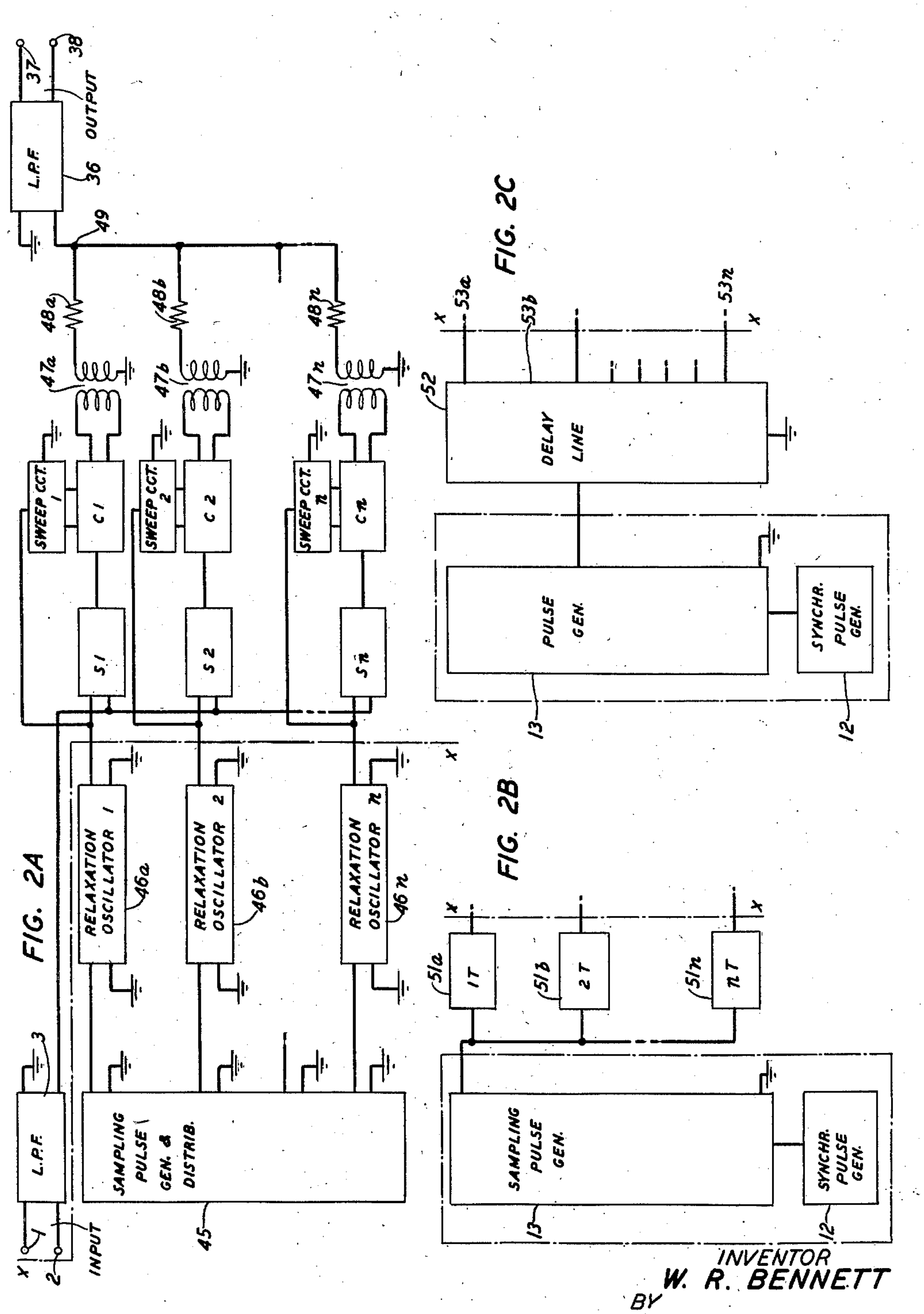
Fig. 2A is a block diagram of a complex system in accordance with the present invention comprising a plurality of sampling and holding circuits and their associated cathode-ray tubes connected for tandem operation.
Figs. 2B and 2C show modified forms of pulse distribution systems which may be substituted for the pulse distribution system shown to the left of the line X—X of Fig. 2A.
Figure 3A:
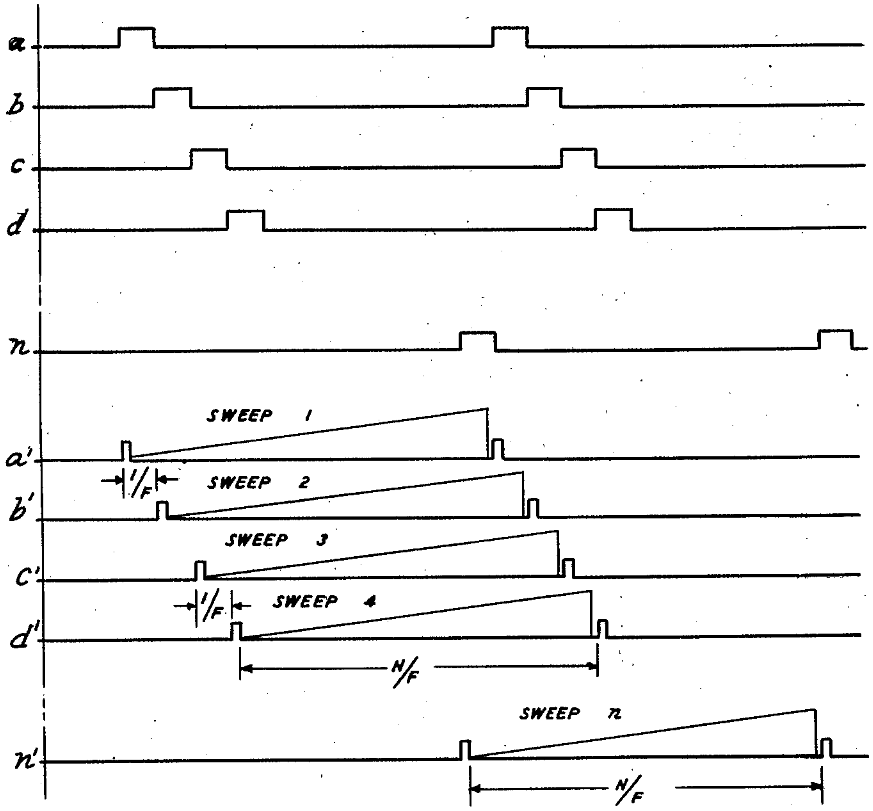
Fig. 3A shows a series of diagrams illustrating the time distribution of the pulses from the sampling pulse generator and distributor 39 of Fig. 2A, and their corresponding time relation to the pulses impressed on the sampling circuits $S_1$, $S_2$, etc., and the voltages impressed on the sweep circuits No. 1, No. 2, etc.
Figure 3B:
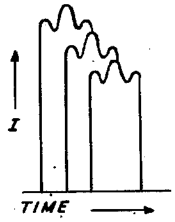

Fig. 3B indicates graphically a typical form of output current realized from the systems of Figs. 2A, 2B and 2C.

Figure 4A:
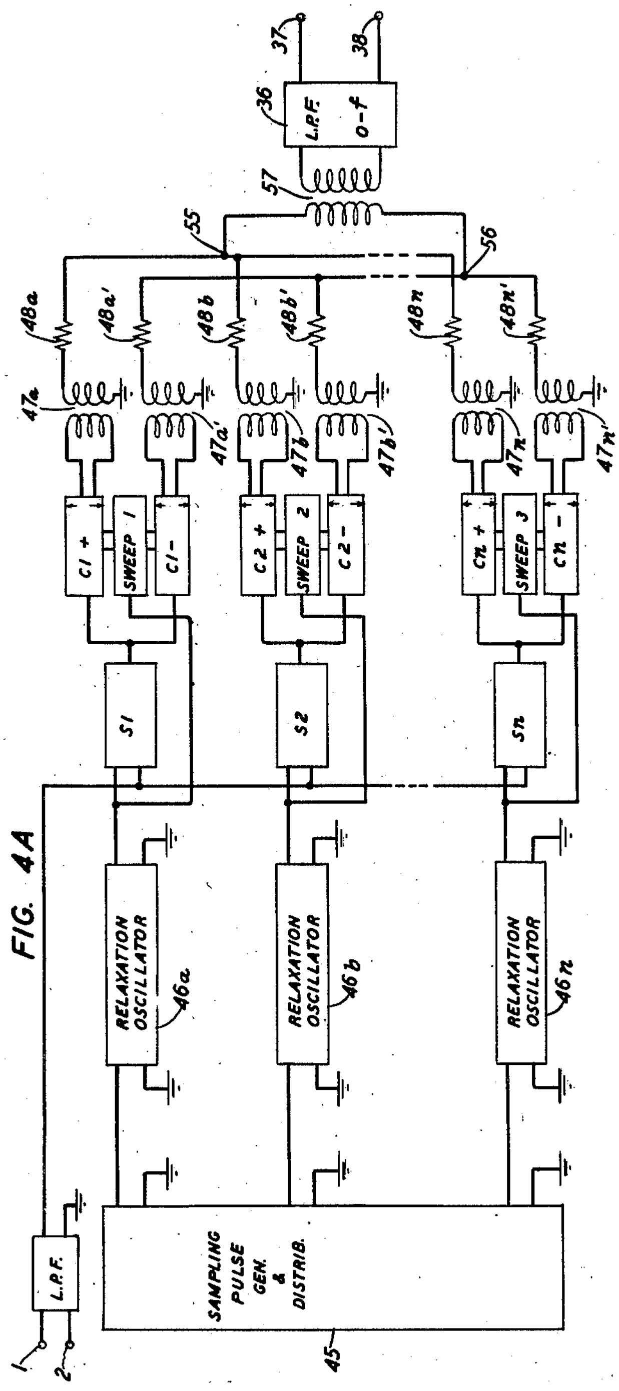

Fig. 4A is a block diagram of a system of the invention similar to that of Fig. 2A, except that it is adapted to utilize a weighting function having both positive and negative components.

Figure 4D:
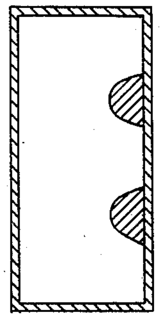
Figure 4C:
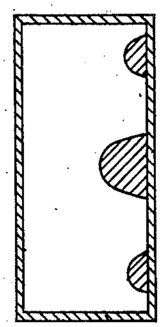
Figure 4B:
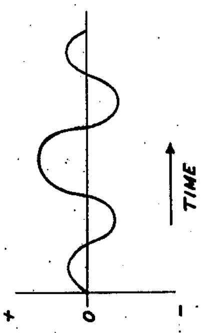

Fig. 4B shows a typical "$g$-function" having both positive and negative components such as utilized in shaping the cathode-ray targets in the system of Fig. 4A.

Fig. 4C shows a section $a$—$a$ through one of the cathode-ray tubes $C_1^+$ of Fig. 4A revealing a target shaped in accordance with the positive component of the "$g$-function" of Fig. 4B; and Fig. 4D shows a section $b$—$b$ through one of the cathode-ray tubes $C^-$ of Fig. 4A revealing a target shaped in accordance with the negative component of the "$g$-function" of Fig. 4B.

Realization of network characteristics by means of sampling and pulse shaping enables the designer to employ techniques not available with inductive, resistive, and capacitive elements. For example, a hypothetical network reacts to an infinitesimal impulse impressed on its input to produce a characteristic impulse response function. If it is desired to simulate the operation of a particular network, its characteristic impulse response can be constructed in the form of a target profile with height proportional to the ordinates of the desired impulse response curve. A ribbon electron beam swept horizontally across the target then produces a current proportional to the height at the line of contact. By making the intensity of the beam proportional to the held sample of signal amplitude, a pulse is thereby produced which is equal to the sample multiplied by a characteristic impulse response function. Repeating this process periodically and filtering the output yields a steady state admittance function which corresponds to the impulse response function. A filter is included in the output to remove frequencies above half the sampling frequency.

Figure 1A:
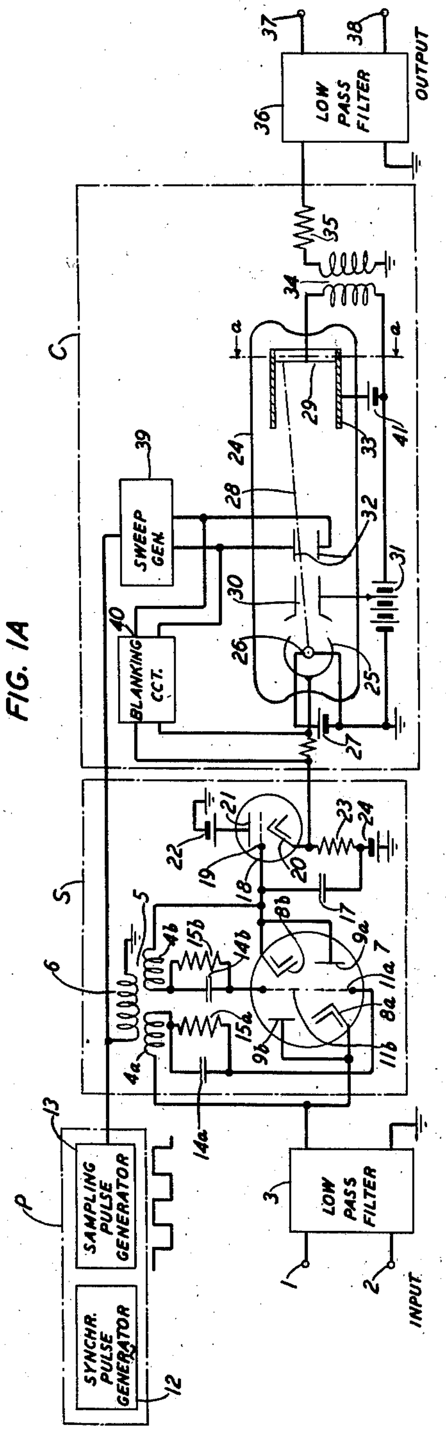
Fig. 1A is a schematic showing of a system for modifying electrical signals in accordance with the teachings of the present invention which comprise a single cathode-ray tube with an associated sampling and holding circuit.
Figure 1C:
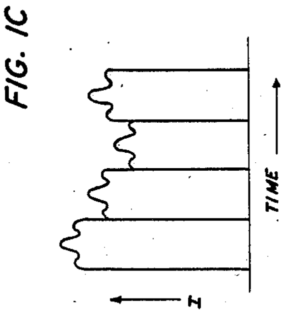
Fig. 1C shows graphically a typical form of output current from the system of Fig. 1A.
Figure 1B:
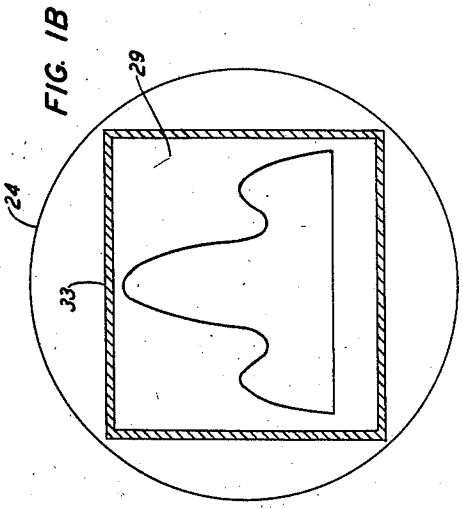
Fig. 1B is an enlarged view of a typical shaped target element of Fig. 1A.

Referring to Figs. 1A, 1B and 1C of the drawings, a system will now be described in detail which is adapted to produce a modified electrical output signal by a series of operations such as described in the foregoing paragraph.

The circuit of Fig. 1A comprises an input section from which the electrical input signal is fed through a low-pass filter into a sampling and holding circuit S at a pulse rate which is controlled by a pulsing circuit P. The held samples of signal are utilized to control the intensity of a beam sweeping a shaped target in the cathode-ray tube C synchronously with the pulse rate, whereby secondary radiation from the target which is proportional to the charge collected thereon passes into the output through a second low-pass filter to produce a response having the desired characteristic.

The impressed electrical signal which is to be modified enters the circuit through the terminals 1 and 2, and is restricted by the low-pass filter 3 to the band 0 to $f$, containing its essential components. Assuming that the output of the filter 3 does no contain zero frequency as an essential component of the signal, the filter 3 is connected to the secondary coils 4*a* and 4*b* of the step-up transformer 5, which is directly connected to the twin input circuits of the sampling and holding circuit S.

The sampling circuit S comprises the twin-triode tube 7, having cathodes 8*a* and 8*b*, plates 9*a* and 9*b*, and grids 11*a* and 11*b*. The cathodes and plates are cross-connected, the cathode 8*a* to the plate 9*b* and the plate 9*a* to the cathode 8*b*. The grids 11*a* and 11*b* are inductively coupled through twin circuits, which include the primary coils 4*a* and 4*b* and secondary coil 6 of the transformer 5, to the pulsing circuit P. The pulsing circuit P comprises a synchronizing sine wave generator 12 of the desired frequency connected to trigger a sampling pulse generator 13, which may take the form of a multivibrator or other square-wave generator known in the art. Square top sampling pulses from the output of pulsing circuit P are impressed on the primary coil 6 of the transformer 5.

The twin circuits which function to conduct the sampling pulses from transformer 5 to the grids 11*a* and 11*b* include substantially identical parallel combinations of condensers 14*a*, 14*b* and resistances 15*a*, 15*b*, which serve in each case to hold a negative bias between pulses which blocks the flow of plate current in the respective circuits except when the square top blocking pulse from the pulsing circuit P is present. When the latter is applied, both of the twin-triode circuits become conducting, providing a low resistance path for either positive or negative current from the transformer 5. Depending on whether the signal is positive or negative, current then passes from one or the other of the plates 9*a* or 9*b* to a holding circuit comprising the condenser 17 and the cathode-follower tube 18, which includes a grid 19, a cathode 20, and a plate 21 energized by a positive potential source 22. The condenser 17, which is connected between the grid 19 and a junction point between the resistor 23 and the negative bias 24 in the circuit of cathode 20, then charges or discharges quickly to the signal potential, and holds this value of potential during the interval between pulses. This same value of potential appears across the resistance 23, and is impressed in series with a suitable negative bias from the source 24 onto the control grid 25 of the cathode-ray tube C, which is of the general type disclosed by F. Gray in Patent 2,257,795, October 7, 1941.

The cathode-ray tube C comprises a glass tube 24, in one end of which is disposed an electron emitting cathode 26 energized by a potential source 27 to produce a beam 28 which scans a shaped target 29 disposed in its path at the other end of the tube. The target 29 is critically shaped in a plane normal to the plane of Fig. 1A, having a vertical dimension which varies linearly in accordance with a particular weighting function which is derived in a manner which will be described in detail hereinafter. Fig. 1B shows a view of a target corresponding to a typical weighting function as viewed in a plane normal to the plane of Fig. 1A along the section line *a*—*a*.

The focussing electrode 30, which is charged to a positive potential by the energizing source 31, serves to form the beam 28 into a vertical ribbon of charge, which sweeps left to right across the target 29 at a repetitive frequency which is determined by the charge on the electrostatic deflection plates 32 connected to the output of the conventional linear saw-tooth sweep generator 39. Operation of the sweep generator 39 is synchronized by connection to the sampling pulse generator 13, so that the sweep of the cathode-ray beam from left-to-right across the target is initiated at the same time that the sampling pulse is removed from the twin-triode tube 7, and continues until the beam reaches the other target edge just prior to the appearance of the next succeeding sampling pulse. The beam returns quickly to its initial position after the target has been traversed. In order to eliminate distortion of the output signal the beam 28 is blanked during the return trip by means of a blanking circuit 40 which may take the form of a generator of negative pulses, such as a multivibrator, operation of which is triggered when the sweep voltage reaches a maximum positive value. The negative pulse output of the blanking circuit 40 is utilized to negatively bias the beam control-grid 25 below cut-off potential during the return sweep. Because the beam 28 is ribbon shaped in a vertical plane, and because the vertical dimension of the target varies linearly with the weighting function, the area of contact of the beam with the target is at each point proportional to the weighting function in accordance with which the target is shaped.

Electrons are emitted by the target 29 throughout the area of contact by the well-known phenomenon of secondary emission, the number of electrons emitted being proportional to the product of the beam current and the contact area. The secondary electrons are collected by a metallic ring 33 surrounding the target 29, and having a positive potential with respect thereto maintained by the biasing source 41. The amount of current flowing in the collector ring 33 is therefore proportional to the product of the signal sample and the vertical target dimension, which represents the weighting function. This current is filtered and delivered to the output terminals 37 and 38 through a circuit which includes the coupling transformer 34 in series with the resistance element 35, and the low-pass filtering circuit 36 which has cut-off frequency at $f$ which is preferably half of the sampling frequency. The output current, as shown in Fig. 1C, thus resembles a series of pulsed samples of the input signal, each of which is a replica of the weighting function.

In order to provide a better understanding of the concepts which underlie the present invention, the operation of the circuit described in the foregoing paragraphs will be analyzed step by step and discussed in mathematical terms. It will be apparent that in the system of the present invention usual current design procedures in terms of electrical network components are replaced by consideration of geometrical construction and timing arrangement, whereby a desired electrical output response is obtained by superposing a series of properly shaped pulses in critical time relation.

The physical process performed by the system of Fig. 1A may be broken down into the following functional steps.

I. The step of instantaneous sampling, in which a continuously varying signal is converted into a set of regularly spaced pulses of infinitesimal duration, is performed by the pulsing circuit P operating on the input signal through the twin-triodes of the sampling circuit $S_1$.

II. The step of holding the instantaneous samples, whereby the duration of each pulse is extended at constant height until the next succeeding pulse appears, is performed by the condenser 17, which controls the grid potential of the cathode-follower tube 18, and hence the intensity of the cathode-ray beam 28.

III. The step of multiplying each pulse by the weighting function is performed by the sweep of the cathode-ray beam 28 across the shaped target 29.

IV. The final steps of collecting and filtering the output signal are performed by the continuous passage of output current from the secondary collecting ring 33 through the transformer 34 and the low-pass filter 36 to the output terminals.

In accordance with Step I, the wave resulting from taking regularly spaced instantaneous samples of a signal is equal to the limit as $\epsilon$ becomes small of the product of the signal and an on-and-off switching function which is unity throughout a time $\epsilon$ in each sampling period and zero the remainder of the period T. Thus if the signal is $S(t)$, the desired result is $$F(t)=S(t)\lim_{\epsilon \to 0}\left[\frac{\epsilon}{T}+\frac{2}{\pi}\sum_{m=1}^{\infty}\sin\frac{m\pi\epsilon}{T}\cos\frac{2m\pi t}{T}\right] \qquad (1)$$

As $\epsilon$ approaches zero, the amplitude of each term in the series also approaches zero, which is to be expected because the time the switch is open becomes vanishingly small. However, $\epsilon$ can be taken not quite zero but small enough so that the amplitude factor, $$\frac{2}{m\pi}\sin\frac{m\pi\epsilon}{T}=\frac{2\epsilon}{T} \qquad (2)$$

for a group of low values of $m$. If, by the action of the low-pass filter 3, the spectrum of $S(t)$ is confined to the frequency region occupied by the first half of these values of $m$, the higher values of $m$ will be of no interest and the lower part of the frequency spectrum of $F(t)$, with which we are concerned, will be represented adequately by the following equation:

$$F_0(t)=\frac{\epsilon S(t)}{T}\left[1+2\sum_{m=1}^{M}\cos 2m\pi f_r t\right] \qquad (3)$$

where $f_r=1/T$, the spectrum of $S(t)$ is confined to frequencies below $Mf_r/2$, and $F_0(t)$ is the time function corresponding to that part of the spectrum of the samples in the range below $Mf_r$. If $S(t)$ consists of a single frequency component $Q\cos 2\pi f_s t$, $$F_0(t)=\epsilon f_r\left[Q\cos 2\pi f_s t+\sum_{m=1}^{M}Q\cos m2\pi(f_r\pm f_s)t\right] \qquad (4)$$

Note that further decrease in $\epsilon$ does not change the relative magnitudes of components in this part of the spectrum. Equation 3 represents what is to us the essential part of the spectrum of infinitesimally narrow pulses occurring at $t=t_n$ with the $n^{th}$ pulse having area $\epsilon S(t_n)$. If we divide by $\epsilon$ we get the essential part of the spectrum of unit impulses of height $S(t_n)$ at time $t_n$. Operational Step I thus sets up a train of unit impulses, each of which is multiplied by a different constant depending on the signal amplitude, e. g., $a_1, a_2 \ldots a_n$.

Now assume that each instantaneous sample $S(t_n)$ is multiplied by a pulse $g(t-t_n)$ where $t_n$ is the time at which the $n^{th}$ sample occurs and $g(t)$ is an arbitrary pulse expressed as a function of time. The result is the same as we would get if we applied $S(t_n)$ multiplied by a unit impulse (a pulse of infinite height, infinitesimal duration, and unit area) at time $t=t_n$ to a network having the impulse response function $g(t)$. It will be recalled that $g(t)$ for a network, which will hereinafter be referred to as the characteristic "$g$-function" of a network, is the derivative of the indicial admittance with respect to time.

Operational Steps II and III expand the train of unit impulses produced by Step I into a train of pulses each having a shape impressed by the target 29.

Assume that the vertical dimension of the target 29 is fashioned to correspond with a function of time $g(t)$, in which the horizontal distance X in space is substituted for the time variable $t$.

If a single impulse, produced by Step I, which has a form $a_n\delta(t-t_n)$, where $\delta(t)$ represents a unit impulse, is operated on through functional Steps II, III and IV, the increment of output current resultant therefrom takes the form $a_n g(t-t_n)$. Thus, the functional properties of the system of the present invention are seen to be the same as those of any linear network, such that when an impulse represented by $\delta(t-t_n)$ is applied to the input of the system, the output response is represented by $a_n g(t-t_n)$. It is clear that if the network, or alternatively, the system under description, gives such behavior for one pulse, it will do likewise for all other pulses.

The operation of any such network or system is completely specified by its steady state transfer admittance function, which is uniquely related to the response $g(t)$ when a unit impulse is applied at $t=0$ by the equation:

$$Y(f)=\int_{-\infty}^{\infty} g(t)e^{-i2\pi ft}dt \qquad (5)$$

where $f$ is the steady-state frequency of the input. This equation is a direct consequence of the Fourier integral theorem as discussed for example by George A. Campbell, the practical application of the Fourier integral, Bell System Technical Journal, October 1928, vol. 7, pp. 639–707.

Now, if the input wave is expressed in terms of specific steady-state sinusoidal components, such as, for example, $$E(t)=\sum_{n} A_n \cos (2\pi f_n t+\theta_n) \qquad (6)$$

then the output current of the system resulting from such a wave impressed on the input can be expressed in steady-state terms as follows:

$$I(t)=\sum_{n} A_n|Y(f_n)|\cos [2\pi f_n t+\theta_n+\text{phase } Y(f_n)] \qquad (7)$$

But the steady-state expansion of $E(t)$ to embrace the frequency spectrum from $m=1$ to $m=M$ is actually given by Equation 4, since $E(t)=F_0(t)/\epsilon$. If $f_r-f_s>f_s$ and the cutoff frequency of the low pass filter in the output is $f_r/2$, all components of 4 except the first term are suppressed by the filter. The resultant output current is $$I(t)=f_rQ|Y(f_s)|\cos [2\pi f_s t+\text{phase } Y(f_s)] \qquad (8)$$

Separation of signal and undesired harmonic components requires that the sampling frequency must be at least twice as great as the highest signal frequency component.

Two general results applicable to sampling and holding follow from the foregoing analysis. First, the above-derived equations provide means for calculating the spectrum associated with sampling a given input function followed by holding an arbitrary wave-shape $g(t)$ proportional to the sampled value, whereby it is apparent that a system carrying out these functions operates on a component of frequency $f$ as an admittance equal to $f_rY(f)$. The second result is the inverse of the first, i. e., that a specified admittance function $Y(f)$ may be realized by sampling the signal and holding with a wave shape found by using $1/f_r$ times the inverse Fourier integral of 5:

$$g(t)=\frac{1}{f_r}\int_{-\infty}^{\infty} Y(f)e^{i2\pi ft}df \qquad (9)$$

It is apparent that Equation 9 provides means for calculating the vertical dimension of the target 29, in order that the system of Fig. 1A may be designed to simulate the action of a network having a given transfer admittance $Y(f)$.

Similarity of the results arrived at mathematically in the foregoing paragraphs to those associated with aperture shapes in scanning systems such as telephotography and television leads to the general designation of "aperture effect" for the transmission variations with frequency. The aperture effect associated with holding each sampled value constant throughout the sampling interval has been calculated and can be shown to be the same as that of a rectangular aperture. This result also follows immediately by inserting a rectangular function for $g(t)$ in Equation 5.

Other pulse shapes which may be useful in sampling and holding systems in place of the rectangular shape utilized in the sampling and holding circuit S of Figure 1A are the exponentially and linearly decaying types, resulting, for example, if the sampled value is impressed as a voltage on a condenser, and the condenser discharges through a resistance between sampling instants.

A practical complication which arises in systems of the type described with reference to Fig. 1A is that many admittances imply impulse response functions which exist over a long period of time, approaching infinity to secure a perfect realization. This would mean that the holding of the sample and the sweep of the beam across the target would be prolonged beyond the time instant at which it becomes necessary to take a new sample and start a new sweep. This difficulty may be overcome by providing several sampling and holding circuits which operate in turn with each one holding its sample throughout the entire time required to reproduce the desired pulse response function. Each held value then modulates its own beam, either in separate cathode ray tubes, as will be described hereinafter, or in a single multibeam tube, the sweeps being respectively displaced in phase so that one starts at the beginning of each sampling period. If the desired impulse response or "g-function" requires a time $T_1=NT$ for a satisfactory approximation, N sampling and holding circuits are provided, and N cathode-ray tubes having N beams and N sweeps, with a timing framework to start the operation of the individual sets successively and repeat the cycle of operation after N sampling intervals. The relation also holds that if the applied signal contains frequencies in the band from zero to B, the maximum sampling interval $T=1/2B$. It follows that $$N>2BT_1=\frac{2B}{\beta} \qquad (10)$$

where $\beta=1/T_1$ is the frequency equal to the reciprocal of the time required to approximate the pulse response function.

According to time division or sampling theory expounded, for example, by the present inventor in a paper "Time division multiplex systems," Bell System Technical Journal, April 1941, pages 199 to 221, it is desirable to have a sampling rate F greater than 2B to transmit the signal band without distortion. The duration of the sweep across the target must be great enough to reproduce the essential parts of the impulse response or "g-function."

Referring to Fig. 2A of the drawings, assume that the required sweep duration is greater than $(N-1)/F$, but less than $N/F$, where N is an integer. The block diagram of Fig. 2A shows a system which is adapted to impress pulsed samples of the input signal in succession on N parallel-connected circuits, each of which includes a sampling and holding circuit operating on the input of a cathode ray oscilloscope, having a shaped target. The identically shaped output pulses are continuously superposed in over-lapping order in a common output circuit. The sampling and holding circuits $S_1, S_2, \ldots S_n$, and the corresponding cathode ray tube circuits $C_1, C_2 \ldots C_n$ are identical to the circuits S and C which were described in detail with reference to Fig. 1A of the drawings.

As in the circuit of Fig. 1A, the input signal is impressed on the terminals 1 and 2 and fed through the low-pass filter 3, the output of which is separately coupled to each of the sampling circuits $S_1, S_2 \ldots S_n$ in the manner described with reference to the circuit S in Fig. 1A. The distribution rate at which pulsed samples of the input signal are impressed on the respective circuits $S_1, S_2 \ldots S_n$ is controlled by the sampling pulse generator and distributor 45 which may take the form of a circuit disclosed in Fig. 1A of application Serial No. 646,455, filed February 8, 1946, by L. A. Meacham, now Patent 2,486,491. The circuit 45 comprises a ring of multivibrators having a plurality of output circuits on which a succession of square-top pulses are impressed which have respective time relations such as shown by *a*, *b*, *c*, *d* and in Fig. 3A. The successive adjoining pulses from the multiple output circuits of the generator 45 are translated into a series of spaced pulses by separate passage through the respective relaxation oscillators $46_a, 46_b \ldots 46_n$ which may comprise circuits of the form,, for example, of that shown in Fig. 27, page 50 of "Time Bases" by O. S. Puckle, John Wiley and Sons. The successive spaced pulses from the outputs of relaxation oscillators $46_a, 46_n$ perform the dual functions of introducing pulsed samples of the input signal in spaced time relation into the respective sampling circuits $S_1, S_2 \ldots S_n$, and controlling the tandem operation of the sweep circuits $SC_1, SC_2 \ldots$ and $SC_n$ which control the sweeps of the beams in the respective cathode ray tubes $C_1, C_2 \ldots C_n$. The relative time relations of the sampling pulses and the beam sweeps in the respective parallel circuits are shown by *a'*, *b'*, *c'*, *d'*, and *n'* of Fig. 3A. The sweep cycles in each of the cathode ray tube circuits are so timed that sweep No. 1 electron tube $C_1$ is initialed as soon as the sampling pulse No. 1 is removed; sweep No. 2 on electron beam tube $C_2$ starts when sampling pulse No. 2 is removed, etc.

The output circuits from the secondary electron collectors of each of the cathode ray tubes $C_1, C_2 \ldots C_n$ are connected through their respective transformers $47_a, 47_b \ldots 47_n$ and isolating resistors $48_a, 48_b \ldots 48_n$ in parallel to a common output junction 49, from which the output current passes through the low-pass filter 36 to the output terminals 37 and 38. From the diagram of Fig. 3B it is seen that the output current comprises a series of identical pulses each shaped in accordance with a desired "*g*-function" and modified in accordance with the signal amplitude, which are superposed in overlapping order.

Numerous modifications of the system described in the foregoing paragraphs, all of which are within the scope of the present invention, will readily occur to those skilled in the art. For example, instead of using a circuit generating N pulses, such as the generator 45 of Fig. 2A, the portion of the circuit to the left of the line *x—x* may be replaced as shown in Fig. 2B by a pulse generating circuit P of the type shown in Fig. 1A having a single output, which feeds into a plurality of delay circuits $51_a, 51_b \ldots 51_n$ in parallel, each having different values of delay corresponding, respectively, to time equal to 0, T, 2T ... $(N-1)T$ seconds.

Another alternative form is shown in Fig. 2C, in which the circuit of Fig. 2A to the left of the line *x—x* is replaced by a similar pulsing circuit P having a single output which feeds into a delay line 52. Pulses delayed by the desired amounts are taken off at different output points $53_a, 53_b \ldots 53_n$ along the line 52.

For purposes of illustration, the application of the method hereinbefore set forth to typical difficult problems in network design will be considered. Assume that one has a signal containing components in the range zero to B and it is desired to insert an ideal low-pass filter cutting off at frequency $f_c$ with no attenuation variation, from zero to $f_c$ and with linear phase shift. From Equation 7 the weighting or "*g*-function" which determines the target shape may be computed as follows:

$$g(t)=A_0\int_{-f_c}^{f_c} e^{i2\pi f(t-\tau)}df=\frac{A_0 \sin 2\pi f_c(t-\tau)}{\pi(t-\tau)} \quad (23)$$

The pulse generator should deliver as many lobes of this function as are necessary to secure a satisfactory approximation to the desired filter. I have estimated that loss variations in the main part of the band can be held to a few tenths of a decibel by making the "*g*-function" duration $T_1=10/f_c$. It follows from Equation 10 that one should then require N to be equal to $20B/f_c$. Thus if the cut-off frequency desired were half the width of the input spectrum, one would need 40 sets of sampling and holding circuits with associated pulse modulating equipment.

It will be noted that the "*g*-function" derived in the foregoing paragraphs contains both positive and negative values of amplitude, in which case the systems described hereinbefore would not function adequately to produce the desired result. A system modified to utilize "*g*-functions" having both positive and negative components is shown in Fig. 4A of the drawing. This system is exactly similar to that of Fig. 2A except for the fact that the output currents of each of the sampling and holding circuits $S_1, S_2 \ldots S_n$ are divided into two equal components which pass into separate cathode ray tube circuits, $C_1^+, C_1^-$; $C_2^+, C_2^-$ etc. These cathode ray tube circuits are identical in form to the cathode ray tube circuits described hereinbefore, except for the fact that circuits $C_1^+, C_2^+ \ldots C_n^+$ have targets shaped in accordance with only the positive components of the selected "*g*-function," while the cathode ray tubes $C_1^-, C_2^- \ldots C_n^-$ have targets shaped in accordance with only the negative components of the selected "*g*-function."

For example, assume a selected "*g*-function" has a form shown in Fig. 4B. Then the targets in cathode ray circuits $C_1^+, C_2^+ \ldots C_n^+$ will assume the form shown in Fig. 4C, while the targets in cathode ray tubes $C_1^-, C_2^- \ldots C_n^-$ will assume the shape shown in Fig. 4D. Targets of the form of Fig. 4C are disposed in tubes $C_1^+, C_2^+ \ldots C_n^+$ in positions corresponding to the target 29 of Fig. 1, as indicated by the section lines *a—a*; and targets of the form of Fig. 4D are disposed in corresponding positions in $C_1^-, C_2^- \ldots C_n^-$.

Output currents from the cathode ray tubes $C_1^+, C_2^+ \ldots C_n^+$ are respectively passed through the coupling transformers $47_a, 47_b \ldots 47_n$ and the isolating resistors $48_a, 48_b \ldots 48_n$ to the common junction point 55. Similarly, output currents from the cathode ray tubes $C_1^-, C_2^- \ldots C_n^-$ are respectively passed through corresponding coupling transformers $47_a', 47_b' \ldots 47_n'$ and isolating resistors $48_a', 48_b' \ldots 48_n'$ to the common junction 56. The junctions 55 and 56 are connected to opposite ends of the primary coil of transformer 57, whereby the components of output current separately modified by the positive and negative parts of the "*g*-function"

are combined in push-pull relation, before passing through the low-pass filter 36 to the output terminals 37 and 38. It will be apparent to those skilled in the art that within the scope of the present invention numerous systems equivalent to the one shown can be devised for combining the positively and negatively modified components of output current.

Moreover, although the present invention has been described by way of illustration with reference to typical embodiments comprising certain elements in combination and having certain circuit arrangements, it will be apparent to those skilled in the art that the teachings of the present invention may be applied in a variety of forms to embodiments comprising other elements in different circuit arrangements than herein disclosed.

What is claimed is:

1. The method of modifying an electrical current which varies in amplitude as a function of time which comprises sampling said current at regular intervals, holding each of the samples so derived for a predetermined period, utilizing said held samples to intensity modulate a beam of electrons, utilizing said beam to scan a target at a repetitive rate which is an integral multiple of said sampling rate, varying the amount of charge deposited from point to point on said target by said beam in accordance with the product of the amplitude of each said held sample and a predetermined weighting function, and continuously collecting an output current which corresponds to the charge deposited on said target.

2. A system for synthesizing a given electrical characteristic which comprises in combination a pulsing circuit for deriving successive samples of an input signal at a regular pulse rate, a storage circuit for holding each of said samples for a predetermined period, a source of a beam of electrons, means responsive to current derived from said storage circuit for controlling the intensity of said beam in accordance with the magnitude of said held samples, a target disposed in the path of said beam, deflecting means responsive to said pulsing means to control said electron beam to periodically scan said target at a scanning rate which is synchronized with said pulse rate, said target shaped in the direction of scan of said beam in accordance with a predetermined shaping function, and means in energy transfer relation with said target for deriving an output current which is correlated with the charge laid down on said target by said beam.

3. A system for synthesizing a predetermined electrical characteristic which comprises in combination a pulsing circuit for deriving successive samples of an input signal at a regular pulse rate, a holding circuit including a condenser responsive to assume the potential of each of said pulsed samples for a given time interval, a cathode-ray tube having a source of a beam of electrons, means responsive to control the intensity of said beam in accordance with the charge on said condenser, a target positioned in the path of said beam, deflecting means controlled by said pulsing circuit to actuate said electron beam to periodically scan said target at a scanning rate which is synchronized with said pulse rate, said target having a shape which varies in the direction of scan of said beam in accordance with a predetermined weighting function and an output circuit responsive to secondary radiation from said target for drawing an output current which is correlated with the charge deposited on said target by said beam.

4. A system for synthesizing a given electrical output current which comprises in combination, a pulsing circuit for deriving successive samples of an input signal at a regular pulse rate, a plurality of storage circuits, a pulse distribution circuit connected to impress pulsed samples of said input signal on each of said storage circuits in staggered time relation, each said storage circuit operative in staggered time relation for holding a respective one of said samples for an interval of the same predetermined length, a plurality of sources of beams of electrons, means responsive to current derived from each of said storage circuits for controlling the intensity of a respective one of said beams in accordance with the magnitude of the sample held by said individual storage circuit, a plurality of shaped targets each disposed in the path of a respective one of said beams, separate deflecting means to control the scanning motion of each of said beams over its respective target, synchronizing means under control of said pulse distribution means for controlling each of said deflecting means to correlate scanning motions of said respective beams with the distribution of pulses to said respective storage circuits, and a common output circuit continuously responsive to receive output current from each of said targets, whereby the individual currents are added in staggered time relation to produce a modified output current.

5. A system for synthesizing a predetermined electrical output current which comprises in combination a pulsing circuit for deriving successive samples of an input signal at a regular pulse rate, a pulse distribution circuit, a plurality of holding circuits, said pulse distribution circuit connected to impress pulsed samples on each of said holding circuits in staggered time relation, each of said holding circuits including a condenser responsive to assume the potential of one of said pulsed samples for a given time interval, a cathode-ray tube having a source of a beam of electrons associated with each said holding circuit and including means for varying the intensity of said beam in accordance with the current output of said respective holding circuit, each of said cathode-ray tubes including a target having substantially the same shape interposed in the path of said beam, deflecting means, and an output circuit associated with each said target and responsive to receive secondary radiation from said target, synchronizing means responsive to said distribution circuit to synchronize the operation of each of said deflecting means with the introduction of said pulsed samples in each of said cathode-ray tube circuits, and a common output circuit responsive to receive the respective output currents from each of said cathode-ray tubes whereby the individual currents are added together in overlapping order to produce a modified output current.

6. A system for translating an applied signal, said system comprising in combination an electrical signal source, a sampling circuit for continuously deriving successive samples of said signal at a sampling rate of uniform period and a mechanism which operates under control of said sampling circuit to convert each of said samples into a corresponding succession of pulses all of the same shape each having an amplitude determined by the amplitude of the corresponding sample and a duration which exceeds the period of said sampling rate.

7. The method of signal translation which comprises continually deriving from an input signal regularly spaced samples varying in amplitude from one to another in conformity with and simulation of the variations in the amplitude of said signal, separately generating a corresponding succession of regularly spaced pulses all of the same predetermined shape, varying the magnitude of the successive pulses under the control of and in accordance with the magnitude of corresponding successive signal samples, combining the said pulses of varying magnitude and uniform shape to form an output signal, and removing from said output signal any frequency components lying above the frequency range occupied by said input signal.

8. The method of signal translation which comprises sampling an input signal at regularly spaced intervals, simultaneously generating a synchronized periodic succession of pulses all of the same predetermined shape and duration, said duration exceeding the sampling intervals of said succession of pulses, varying the magnitude of the successive pulses under the control of and in accordance with the magnitude of corresponding successive signal samples, and combining said pulses of varying magnitude in overlapping time relation to form an output signal.

WILLIAM R. BENNETT.

References Cited in the file of this patent

UNITED STATES PATENTS

| Number | Name | Date |
|---|---|---|
| 2,257,795 | Gray | Oct. 7, 1941 |
| 2,335,265 | Dodington | Nov. 30, 1943 |
| 2,464,607 | Pierce | Mar. 15, 1949 |
| 2,513,291 | De Loraine et al. | July 4, 1950 |